(12) United States Patent
Pati et al.

(10) Patent No.: US 11,343,252 B2
(45) Date of Patent: May 24, 2022

(54) KERNEL LEVEL APPLICATION DATA PROTECTION

(71) Applicant: VMware, Inc., Palo Alto, CA (US)

(72) Inventors: Akash Pati, Bangalore (IN); Shivam Srivastav, Bangalore (IN); Anirudh Singh Rathore, Karnataka (IN)

(73) Assignee: VMWARE, INC., Palo Alto, CA (US)

( * ) Notice: Subject to any disclaimer, the term of this patent is extended or adjusted under 35 U.S.C. 154(b) by 274 days.

(21) Appl. No.: 16/679,711

(22) Filed: Nov. 11, 2019

(65) Prior Publication Data

US 2021/0144143 A1    May 13, 2021

(51) Int. Cl.
*H04L 9/40*    (2022.01)
*H04L 29/06*    (2006.01)

(52) U.S. Cl.
CPC .......... *H04L 63/101* (2013.01); *H04L 63/168* (2013.01); *H04L 63/20* (2013.01)

(58) Field of Classification Search
CPC ...... H04L 63/20; H04L 63/101; H04L 63/168
USPC .......................................................... 726/4
See application file for complete search history.

(56) References Cited

U.S. PATENT DOCUMENTS

| | | | |
|---|---|---|---|
| 2011/0010559 A1* | 1/2011 | Kim ................... | G06F 21/6209 713/189 |
| 2012/0137375 A1* | 5/2012 | Ramachandran ... | G06F 21/6218 726/28 |
| 2018/0239921 A1* | 8/2018 | Goyal ................. | G06F 21/6227 |

* cited by examiner

*Primary Examiner* — Anthony D Brown
(74) *Attorney, Agent, or Firm* — Thomas Horstemeyer, LLP

(57) ABSTRACT

Disclosed are various examples for kernel level application data protection. In one example, a security label map is written to a kernel layer. The security label map includes a security label and a list of permitted applications for files originated by a protected application. A file access system call is intercepted by kernel-level management instructions. An application identity is identified for an application requesting to access a secure file. Access to the secured file is permitted or denied based on a comparison of the application identity with the list of permitted applications.

20 Claims, 5 Drawing Sheets

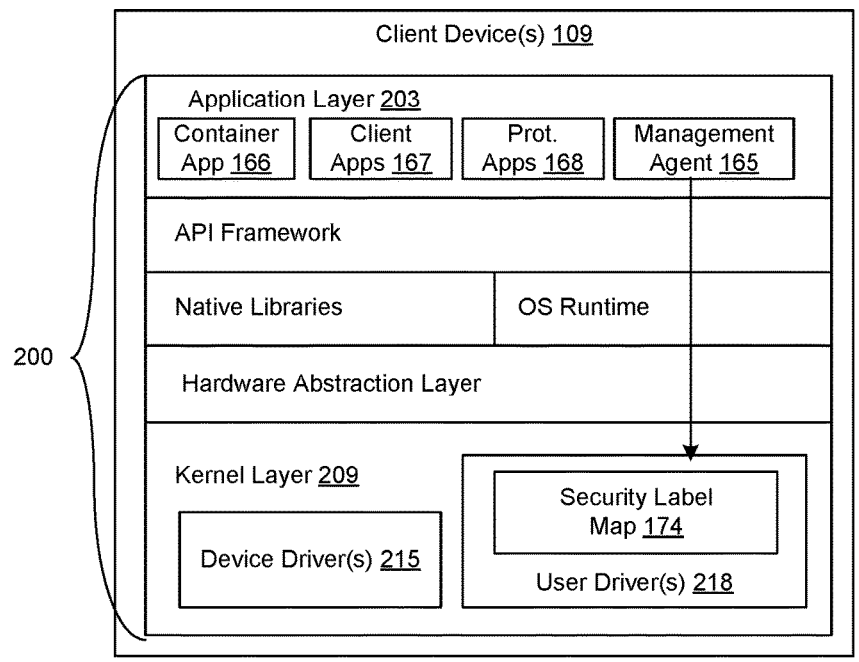
FIG. 2A
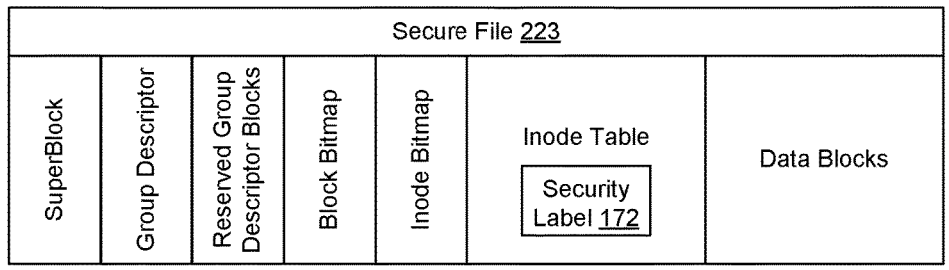
FIG. 2B
| Security Label Map 174 | | |
|---|---|---|
| Key (Sec Lbls 172) | Value (Permitted Apps 173) | Value (Orig. Apps 166) |
| Sec_Label_1 | (mgmt_svc_viewer_app, self_app1, other_viewer_app, other_email_app) | App_1 |
| Sec_Label_2 | (mgmt_svc_viewer_app, self_app2, other_viewer_app, other_email_app) | App_2 |
FIG. 2C

KERNEL LEVEL APPLICATION DATA PROTECTION

BACKGROUND

Organizations and other enterprises may desire to secure enterprise emails, presentations, documents and other content to prevent theft, data loss and unauthorized access. A management service can provide protection for this content. However, malicious or unauthorized applications can access files that are saved to enterprise devices. This can result in a data breach or data leak of the enterprise content. This sort of data breach can become more likely if the enterprise utilizes a bring-your-own-device model. Users can install applications that can be helpful or harmful with respect to enterprise workflows.

One solution can be to prevent users from installing any applications other than enterprise-permitted applications. However, this solution can reduce user adoption rates and overly limit the device for personal use. The reduction in adoption rates can affect enterprise productivity, rendering this potential solution ineffective for some enterprises. Another solution could include forcing all files of a particular type to be accessible only using a particular application. However, this solution can likewise be overly restrictive and ineffective for some enterprises. Accordingly, there exists a need for more effective application data protection for enterprise settings.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2A is a drawing of an example platform architecture for the client device of FIG. 1.

FIG. 2B is a drawing of an example file structure for a file stored in the client device of FIG. 1.

FIG. 2C is a drawing of an example structure for a security label map utilized by components of the networked environment of FIG. 1.

DETAILED DESCRIPTION

The present disclosure relates to kernel level application data protection. Organizations and other enterprises can secure emails, presentations, documents and other content to prevent theft, data loss and unauthorized access. Users can install applications that can be helpful or harmful with respect to enterprise workflows. A data breach can result if malicious or unauthorized applications access enterprise-related files. However, the present disclosure describes mechanisms that can provide protection for enterprise content. For example, the management agent or another application can generate a secured file based on each file created, downloaded, received, or otherwise originated by the application. The secured file is embedded with a security label associated with the originating application. Kernel-level management instructions can intercept system calls from an application attempting to access a secured file, and identify its security label. The kernel-level management instructions can permit or deny an application from accessing the file based on whether a security label map indicates that the application is permitted to access files with the identified security label.

Figure 1:
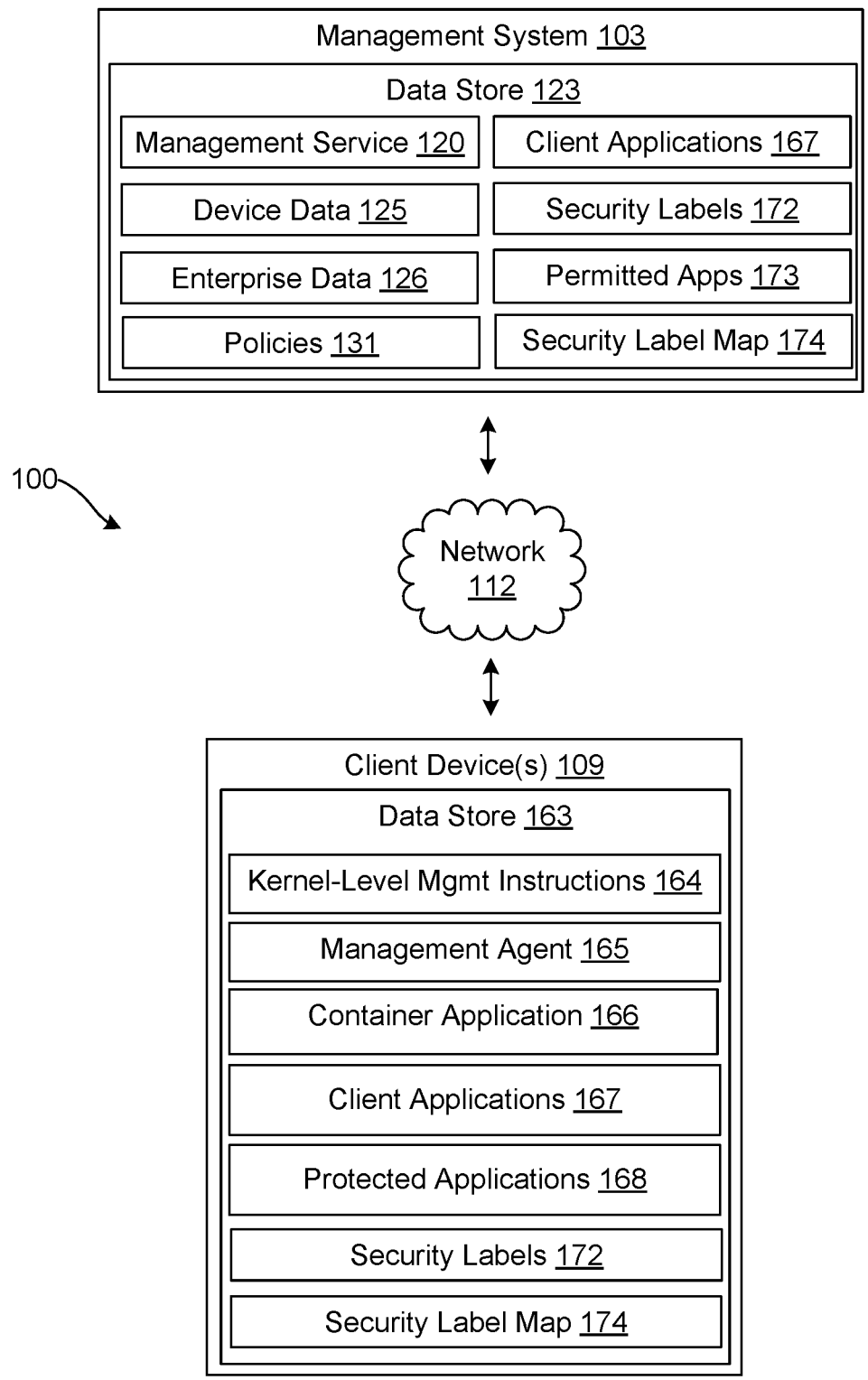
FIG. 1 is a drawing of an example of a networked environment, including a management system and a client device.

With reference to FIG. 1, shown is an example of a networked environment 100. The networked environment 100 can include a management system 103 and client device(s) 109 in communication with one another over a network 112. The management system 103 can provide an enterprise with access to email, corporate documents, social media and other enterprise content.

The network 112 can include, for example, the Internet, intranets, extranets, wide area networks (WANs), local area networks (LANs), wired networks, wireless networks, other suitable networks, or any combination of two or more such networks. The networks can include satellite networks, cable networks, Ethernet networks, cellular networks, telephony networks and other types of networks.

The management system 103 can include a server computer or any other system providing computing capability. Alternatively, the management system 103 can include a plurality of computing devices that are arranged in one or more server banks, computer banks, or other arrangements. The management system 103 can include a grid computing resource or any other distributed computing arrangement. The computing devices can be located in a single installation or can be distributed among many different geographical locations. The management system 103 can also include or be operated as one or more virtualized computer instances. For purposes of convenience, the management system 103 is referred to in the singular. Even though the management system 103 is referred to in the singular, it is understood that a plurality of management systems 103 can be employed in the various arrangements as described above. As the management system 103 communicates with the client device 109 remotely over the network 112, the management system 103 can be described as a remote management system 103 or a collection of one or more remote computing devices.

The management system 103 can execute a management service 120 to oversee management of the client devices 109. The components executed on the management system 103 can include the management service 120, as well as other applications, services, processes, systems, engines or functionality not discussed in detail. An enterprise, such as one or more companies or other organizations, can operate the management service 120 to oversee or manage the operation of the client devices 109 of its employees, contractors, customers, students or other users having user accounts with the enterprise. An enterprise can be any customer of the management service 120. An enterprise can also be referred to as an organization.

The management service 120 can have a command queue storing an action to perform on a particular client device 109 upon check-in of the client device 109. For instance, the management agent 165 can cause the client device 109 to check-in with the management service 120, identify an action in the command queue and perform the action. An action in the command queue can direct the installation of a profile or the execution of a command or other actions to install software components or implement policies.

In addition, the management service 120 can request that the client device 109 check in using a notification service like APPLE® Push Notification Service (APNS), GOOGLE® Cloud Messaging (GCM), or WINDOWS® Push Notification Services (WNS). The management service 120 can transmit a request to the notification service requesting that the client device 109 check-in or requesting that an application or web app check-in. The notification service can push or otherwise route a notification to the client device 109. Once the notification is received, the management agent 165 or container application 166 can cause the client device 109 to check-in with the management service 120. As described above, the management agent 165 can determine whether a command queue provided by the management service 120 for the respective client device 109 contains any commands or resources for the client device 109, and, if so, can cause the commands or resources to be downloaded or implemented on the client device 109. Other types of push notifications can also be transmitted through the push notification service.

The management service 120 can provide functionality using application program interfaces (APIs). The management service 120 can oversee the operation of client devices 109 enrolled with the management service 120 as well as manage enrollment and un-enrollment operations of the client devices 109. APIs or API calls can be provided for other functionalities of the management service 120 as discussed. For instance, APIs provided can include Representational State Transfer (REST) APIs, Identity Services Engine (ISE) APIs and other APIs.

The data store 123 can include memory of the management system 103, mass storage resources of the management system 103, or any other storage resources on which, data can be stored and accessed by the management system 103. The data stored in the data store 123 can include management data including device data 125, enterprise data 126, policies 131, client applications 167, security labels 172, permitted applications 173, as well as other data.

Generally, device data 125 can include data associated with a configuration of a client device 109 enrolled or managed by the management service 120, as well as an identifier of the client device 109. The identifier can be a serial number, media access control (MAC) address, other network address or other device identifier. In addition, the device data 125 can include an enrollment status indicating whether a client device 109 has been enrolled with the management service 120. In one example, a client device 109 designated as "enrolled" can be permitted to access the enterprise data 126, while a client device 109 designated as "not enrolled," or having no designation, can be denied access to the enterprise data 126.

Additionally, device data 125 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Policies 131 can include application-specific policies for the client applications 167 that are loaded or installed on the client device 109 or are within the container application 166. While the client applications 167 are shown separate from the container application 166, the client applications 167 can also be installed within the container application 166 or launched by the container application 166. An application security policy 131 can also define the policies 131 and additional requirements applicable to a group of client applications 167. The policies 131 can be both application-specific as well as specific to particular users or user accounts with the management service 120. The policies 131 can also include whitelisted and blacklisted client applications 167 for the client device 109. Application whitelisting for the client device 109 permits client applications 167 in a list to be executed on the client device 109, while client applications 167 that are excluded from the list cannot be executed on the client device 109. Application blacklisting for the client device 109 can prevent client applications 167 in a list from being executed on the client device 109, while client applications 167 that are excluded from the list can be executed on the client device 109.

The policies 131 can be based on a number of factors, including geographical location of the client device 109, activation status, enrollment status and authentication data, including authentication data obtained by a device registration system, time, date and network properties, among other factors. The management service 120 can communicate with a management agent or another client application 167 executable on the client device 109 to determine whether states exist on the client device 109 that do not satisfy one or more policies 131. Some of these states can include a virus or malware being detected on the client device 109, installation or execution of a blacklisted client application 167 or a client device 109 being "rooted" or "jailbroken," where root access is provided to a user of the client device 109. Additional states can include the presence of particular files, questionable device configurations, vulnerable versions of client applications 167, or other vulnerability, as can be appreciated.

The client applications 167 can include management service applications and third party applications used for productivity and enterprise workflows. Management service applications can include applications that are provided by the management service 120 for download. Third party applications can be accessed through third party providers, through an application store, or in another manner. In some cases, the management service 120 can store a URL or another network address through which the client device 109 can download a client application 167. The network address can be an address hosted by devices comprising the management system 103 or devices that are separate from the management system 103.

Protected applications 168 can include client applications 167 for which application data is protected. Files created, received, downloaded, or otherwise originated by the protected applications 168 are protected from unauthorized access. The management service 120 can maintain a list of protected applications 168, along with a uniquely associated security label 172 and permitted applications 173 that are allowed to access files originated by a protected application 168.

A security label 172 can include a tag, label, character string, bit array, bit vector, or other data structure associated with a protected application 168. The security label 172 can include a bit vector of a predetermined number of bits, such as a 32-bit vector that can be stored in a single register. The security label 172 can be embedded within each file created, downloaded, received, or otherwise originated by a protected application 168. The security label 172 can be uniquely associated with a protected application 168. As a result, the particular protected application 168 that originated the file can be identified based on the security label 172 that is embedded within a secure file. In some cases, the security label 172 can include an identifier of the protected application 168. The management agent 165, client application 167, or container application 166 can generate a secure file by embedding the security label 172 within a file.

The permitted applications 173 can include an identified set of applications that are permitted to access files that are created, downloaded, received, or otherwise originated by a protected application 168. The management service 120 can provide the management agent 165, protected application 168, or container application 166 with a list, table, security label map 174, or another data structure that includes the permitted applications 173. The security label map 174 can include a list or set of application-specific security labels 172. The security label map 174 can, for each application-specific security label 172, include a list of the permitted applications 173 that can access files that are embedded with the security label 172. In some examples, the permitted applications 173 can include all of the management service applications, but only a specified set of the third party applications.

An enterprise can operate the management service 120 to oversee or manage the operation of the client devices 109 of its employees, contractors, customers, students, or other users having user accounts with the enterprise. The management service 120 can remotely configure the client device 109 by interacting with a management agent 165 or another client application 167 executed on the client device 109. The management service 120 can transmit various software components to the client device 109, which can then be installed or configured by the management agent 165. Such software components can include, for example, additional client applications 167, resources, libraries, drivers, device configurations, or other similar components that require installation on the client device 109 as specified by an administrator of the management service 120. The management service 120 can further cause policies 131 to be enforced on a client device 109. Policies 131 can include device-specific or user-specific settings, for example, restrictions or permissions pertaining to capabilities of a client device 109. For instance, policies 131 can require certain hardware or software functions of the client device 109 to be enabled or disabled during a certain time period or when the client device 109 is physically located at a particular location. Such policies can be implemented by the management agent 165.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch or any other device with like capability. The client device 109 can have a data store 163 that includes kernel-layer management instructions 164, management agent 165, client applications 167, container application 166, and other data. The client device 109 can also be equipped with networking capability or networking interfaces, including a localized networking or communication capability, such as a near-field communication (NFC) capability, radio-frequency identification (RFID), read or write capability or other localized communication capability. The client device 109 can be mobile and easily portable from one location to another.

The kernel-layer management instructions 164 can intercept system calls from any application attempting to access a secure file. The kernel-layer management instructions 164 can identify a security label embedded in the secure file. The kernel-level management instructions 164 can also identify the application that is attempting to access the secure file. The kernel-level management instructions 164 can access a security label map 174, stored in a kernel level or kernel space of the client device 109. Using the security label map 174, the kernel-level management instructions 164 can use the security label as a key to identify a set of permitted applications 173 identified in the security label map 174. The kernel-level management instructions 164 can permit or deny the application from accessing the file based on whether the application is within the set of permitted applications 173 identified in the security label map 174.

The management agent 165 can perform actions on the client device 109. For instance, the management agent 165 can cause the client device 109 to check-in with the management service 120, identify an action in the command queue and perform the action. An action can include the installation of a profile, or the execution of a command or other actions to install software components or implement policies. The management agent 165 can cause a check-in of the client device 109 periodically, on a schedule or upon an event, such as entering a physical location, changing a state of the client device 109, installing an application or receiving a notification on the client device 109. In one example, the contents of the command queue can include a command that the management agent 165 executes on the client device 109. In another example, the contents of the command queue can include a resource or a client application 167 that the management agent 165 installs on the client device 109. In some cases, the client application 167 can be a protected application 168. A command to install the client application 167 can include a URL, URI, IP address or other network address associated with an application hosting service where the client application 167 can be accessed. Functions described for the management agent 165 can alternatively be performed by the container application 166.

The container application 166 can include one or more of the client applications 167, including the protected applications 168. The client applications 167 can be loaded and executed within respective containers of the container application 166. In some cases, the container application 166 can include runtime components needed in order execute the client applications 167. The container application 166 can also include a management software development kit (SDK) associated with the management service 120. The management SDK can include libraries, variables, files and code components that are utilized to perform functions based on the policies 131 of the management service 120.

While the container application 166 is referred to in the singular, multiple container applications 166 can be developed corresponding to different operating systems or platforms or for different types of client devices 109. The container application 166 can access the client application 167 from an application hosting service or the management service 120, load it into a container of the container application 166, and execute it within the container.

The container for the respective client application 167 can specify memory areas or addresses that are accessible by the client application 167. Memory addresses can be used to apply application whitelists and blacklists. Accordingly, memory addresses that are accessible or restricted can be specified for the container of a client application 167, so that data associated with client applications 167 can be accessible or restricted. Other memory addresses, such as system memory addresses, can also be specified as accessible or restricted for the client application 167 by its container.

In FIG. 2A, shown is an example platform architecture 200 for the client device 109. The platform architecture 200 can include an application layer 203, an API framework, native libraries, operating system runtime, a hardware abstraction layer, and a kernel layer 209.

The application layer 203 can include user space applications including the management agent 165, the client applications 167, protected applications 168, the container application 166, and other applications. The kernel layer 209 can include device drivers 215, and user drivers 218. User space applications do not generally reside or affect the kernel layer 209. However, the management agent 165 can utilize a particular user-space driver or user driver 218 to write to the kernel layer 209. For example, a user driver 218 associated with the management service can expose a function that writes or writes to the security label map 174 (e.g., WriteToSecLabelMap( )) within the kernel layer 209. The security label map writing function can be called from the application layer 203. The management agent 165 can call the function from the application layer 203 in order to create, edit, update, or otherwise affect the security label map 174 within the kernel layer 209. In some examples, the container application 166, and certain client applications 167 such as protected applications 168 can also call the function from the application layer 203 in order to create, edit, update, or otherwise affect the security label map 174 within the kernel layer 209. The kernel-level management instructions 164 can access the security label map 174 within kernel space, or from the kernel layer 209.

FIG. 2B is a drawing of an example file structure for a secure file 223 stored in the client device 109. The secure file 223 can be a file that is originated by a protected application 168. The file structure for the secure file 223 can include an EXT4 file structure or another file structure. The secure file 223 can include a superblock, a group descriptor, reserved group descriptor blocks, a block bitmap, an index node (inode) bitmap, an inode table, and data blocks. The inode table can include a predetermined number of bits or bytes. For example, the inode table can include a 256-byte block that can store one or more security label(s) 172. The security label 172 can include a tag, label, character string, bit array, bit vector, or other data structure associated with a particular protected application 168 that originated the file in which it is embedded.

A protected application 168, management agent 165, or container application 166 can embed the security label 172 in a file to generate a secure file 223 based on the file. The security label 172 can identify the protected application 168 that originated the file by downloading, creating, or receiving the file. The security label 172 can be uniquely associated with the protected application 168 that originated the file. The security label 172 can include an identifier or identity of the protected application 168 that originated the file.

In some examples, the protected application 168 can generate the secure file 223. As a result, the protected application 168 can include a particular security label 172 that it embeds in the files it creates, downloads, or receives. Alternatively, the container application 166 can generate the secure file 223 for the protected application 168. The container application 166 can monitor the protected application 168, or memory allocated to the protected application 168, for files that are downloaded, created, received, or otherwise originated. The container application 166 can protect the file by creating a secure file 223 that includes the security label 172 for the protected application 168.

In further examples, the management agent 165 can generate the secure file 223. The management agent 165 can monitor the protected application 168, or memory allocated to the protected application 168, for files that are downloaded, created, received, or otherwise originated. The management agent 165 can protect the file by creating a secure file 223 that includes the security label 172 for the protected application 168 that originated the file.

FIG. 2C is a drawing of an example structure for a security label map 174 utilized by components of the networked environment 100, including the management system 103 and the client device 109. The security label map 174 can be maintained and updated by the management service 120, and can be transmitted to the client device 109. The security label map 174 can be temporarily or durably stored in the application layer 203. The management agent 165 can invoke a function that stores the security label map 174 in the kernel layer 209, for example, in the user driver 218 or memory allocated to the user driver 218.

The security label map 174 can include a number of security labels 172. Each security label 172 can be associated with a list of one or more permitted applications 173. In some cases, the protected application 168 that originated the file can also be associated with the security label 172 in the security label map 174. The security label map 174 can include a number of key-value pairs, tuples or another data structure.

The security label map 174 can include a security label 172 identifier "Sec_Label_1," in association with a list of permitted applications 173 that includes "mgmt_svc_viewer_app," "self_app1," "other_viewer_app," and "other_email_app." This list of permitted applications 173 can be whitelisted applications that are permitted to access a secure file 223 that includes the security label 172, shown as "Sec_Label_1." The security label map 174 can also include an identifier of the protected application 168. The protected application 168 can be identified as "App_1," in association with "Sec_Label_1" within the security label map 174.

The security label map 174 can include a security label 172 identifier "Sec_Label_2," associated with another list of permitted applications 173 that includes "mgmt_svc_viewer_app," "self_app2," "other_viewer_app," and "other_email_app." This list of permitted applications 173 can be whitelisted applications that are permitted to access a secure file 223 that includes the security label 172, shown as "Sec_Label_2." The security label map 174 can also include an identifier of the protected application 168. The protected application 168 can be identified as "App_2," in association with "Sec_Label_2" within the security label map 174.

The list of permitted applications 173 can include the protected application 168 associated with the security label 172, as well as a number of user-specified applications identified through a user interface of the management service 120. The list of permitted applications 173 can alternatively include the protected application 168 associated with the security label 172, as well as a number of default applications, or a predetermined list of secure or trustworthy applications maintained by the management service 120. In some cases, the user-specified applications can be selected ones of the predetermined list of secure or trustworthy applications. In some cases, an untrustworthy application can be identified as untrustworthy, for example, by inclusion in a list of malware or untrustworthy applications received from a third party, or by user-specification through a user interface of the management service 120. The management service 120 can generate an updated security label map 174 that excludes or removes the untrustworthy application from each respective list of permitted applications 173. The management service 120 can then provide the updated security label map 174 to the client device 109. The management agent 165 can update the security label map 174 within the kernel layer 209.

Figure 3:
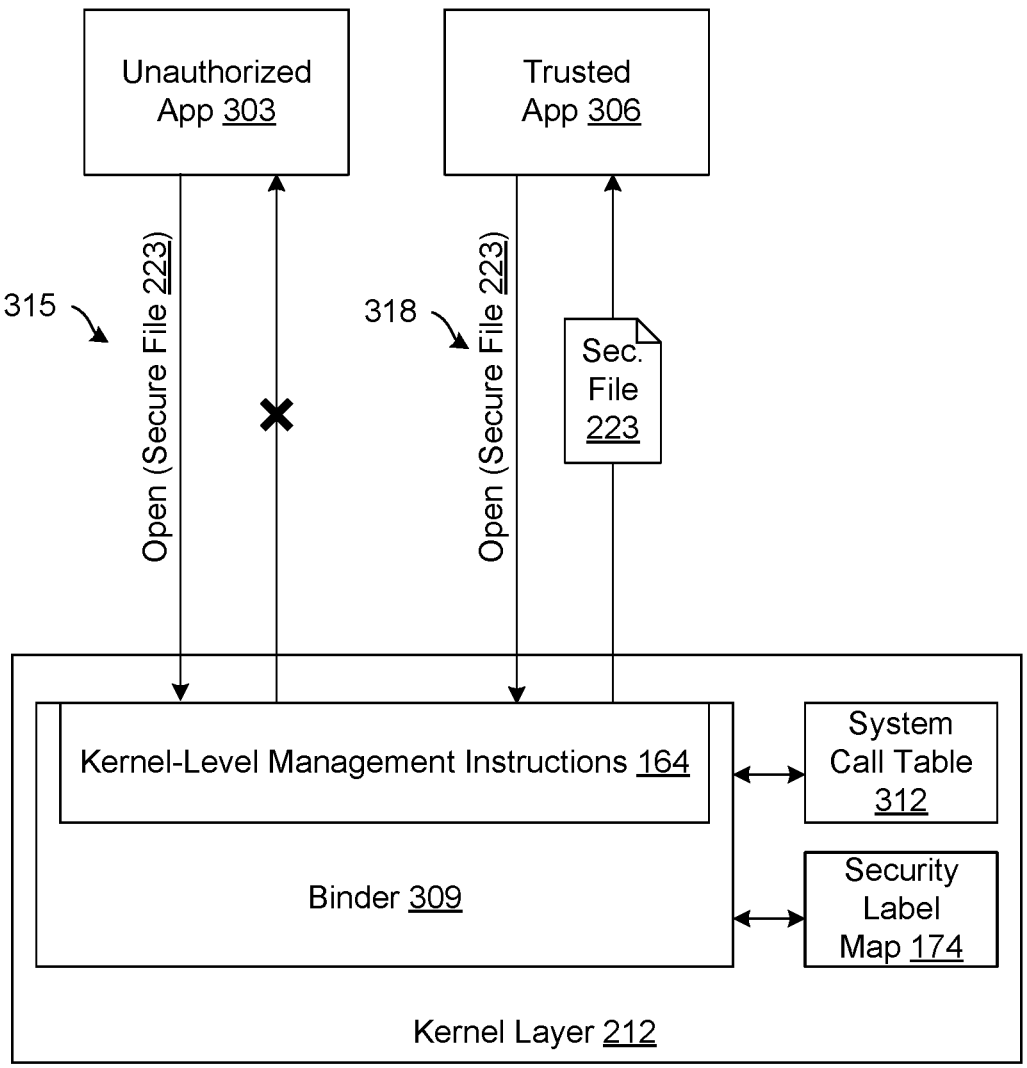
FIG. 3 is a drawing that illustrates functionality implemented by components of the networked environment of FIG. 1.

FIG. 3 is a drawing that illustrates the functionality implemented by components of the networked environment 100. Specifically, this figure illustrates how kernel-level management instructions 164 can permit or deny access to a secure file 223 for applications that request access to the secure file 223, which can be referred to as "requesting applications." The unauthorized application 303 can include malware, adware, a malicious application, or any application that is not included in a list of permitted applications 173 for a particular security label 172 that is associated with the protected application 168 that originated the secure file 223. The trusted application 306 can be an application that is included in the list of permitted applications 173 for the particular security label 172.

The unauthorized application 303 can request to access or open the secure file 223. In order to do this, the unauthorized application 303 can utilize a binder 309 in the kernel layer 209 of the client device 109. The binder 309 can be an inter-process communication mechanism, and can refer to a driver or other mechanism in the kernel layer 209 that provides or facilitates a file open system call and other file access system calls.

The kernel-level management instructions 164 can intercept system calls that are directed to the binder 309. The kernel-level management instructions 164 can include a hook function, such as a Linux security Module (LSM) hook function that intercepts file access system calls. The hook function can utilize a kernel module such as a Linux Loadable Kernel Module (LKM) to gain access to a system call table 312, intercept the a file open or file access system call, and replace it with the kernel-level management instructions 164, or update a pointer to point to the kernel-level management instructions 164. The kernel-level management instructions 164 can also access the security label map 174 stored in the user driver 218.

The unauthorized application 303 can invoke a file access system call 315 to open the secure file 223. The file access system call 315 can specify the secure file 223. While the file access system call 315, can generally be handled by the binder 309, the kernel-level management instructions 164 can intercept the file access system call 315. The kernel-level management instructions 164 can identify the requesting application that invokes the file access system call 315. In this case, the kernel-level management instructions 164 can identify the requesting application as the unauthorized application 303. The kernel-level management instructions 164 can also identify the security label 172 embedded in the secure file 223 specified by the file access system call 315. The kernel-level management instructions 164 can access the security label map 174 and use the security label 172 as a key to identify a value that includes a list of permitted applications 173, associated with the security label 172 within the security label map 174. The kernel-level management instructions 164 can deny the unauthorized application 303 from access to the secure file 223, because the identity of the unauthorized application 303 is not included in the list of permitted applications 173 associated with the security label 172 within the security label map 174.

The trusted application 306 can invoke a file access system call 318 to open the secure file 223. The file access system call 318 can specify the secure file 223. The kernel-level management instructions 164 can intercept the file access system call 318. The kernel-level management instructions 164 can identify the requesting application that invokes the file access system call 318. In this case, the kernel-level management instructions 164 can identify the requesting application as the trusted application 306. The kernel-level management instructions 164 can also identify the security label 172 of the secure file 223 specified in the file access system call 318.

The kernel-level management instructions 164 can access the security label map 174 and use the security label 172 to identify permitted applications 173 associated with the security label 172 within the security label map 174. The kernel-level management instructions 164 can permit or allow the trusted application 306 access to the secure file 223, because the identity of the trusted application 306 is included in the permitted applications 173 associated with the security label 172 for the protected application 168. For example, because the unauthorized application 303 is included in the permitted applications 173, the kernel-level management instructions 164 can pass the file access system call 318 to the binder 309, which can provide the trusted application 306 with access to the secure file 223.

Figure 4:
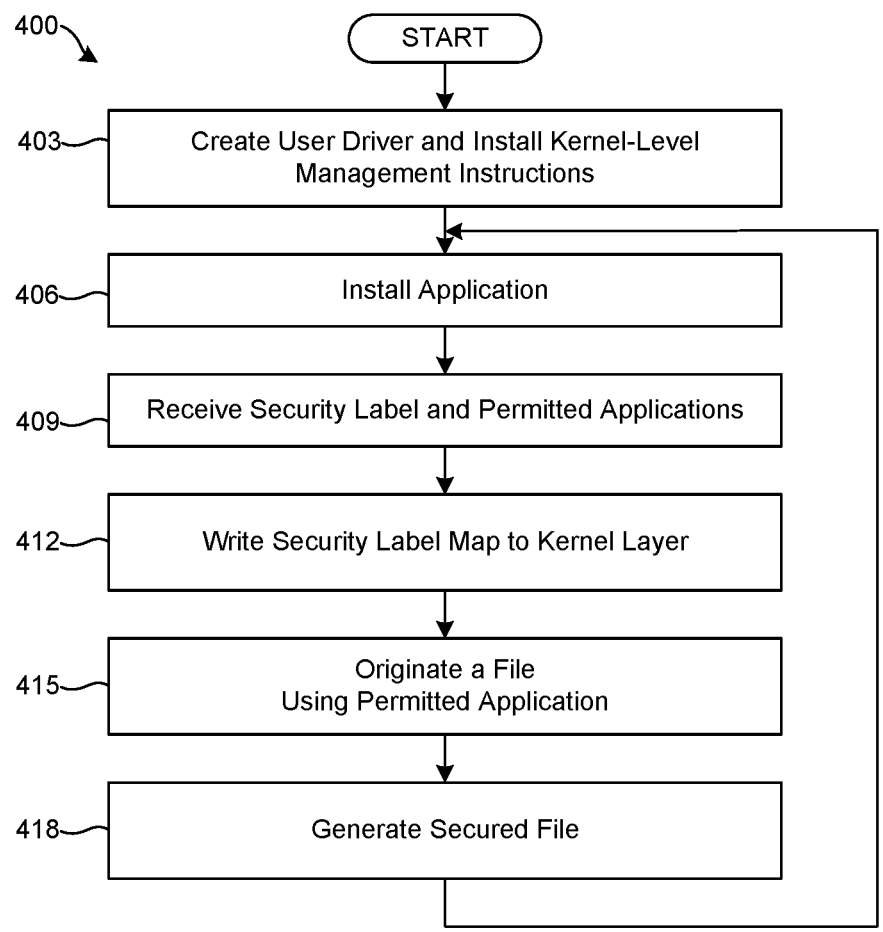
FIG. 4 is a flowchart that illustrates functionality implemented by components of the networked environment of FIG. 1.

FIG. 4 shows a flowchart 400 that illustrates functionality implemented by components of the networked environment 100. Specifically, the flowchart 400 illustrates how instructions executed in the client device 109 generate secured files 223 for protected client applications 167 and protect these files using kernel-level management instructions 164.

In step 403, the management agent 165, or other instructions executed on the client device 109, can create a user driver 218 and install the kernel-level management instructions 164 on the client device 109. The management agent 165 can check in with the management service 120 and retrieve a command to create a user driver 218 and install the kernel-level management instructions 164. While referred to as a singular command, multiple commands can be utilized. The command can include respective network addresses through which the management agent 165 can download the user driver 218 and the kernel-level management instructions 164.

The user driver 218 and the kernel-level management instructions 164 can work in concert to protect access to secure files 223 originated by a protected application 168. The kernel-level management instructions 164 can refer to a module or hook function that intercepts file access system calls such as file open system calls. The user driver 218 can provide a mechanism by which applications of the application-layer 203 can write and update a security label map 174 within the kernel layer 209. In some cases, the user driver 218 and the hook function can each be considered kernel-level management instructions 164.

In step 406, the management agent 165 can install a protected application 168 on the client device 109. The management agent 165 can check in with the management service 120 and retrieve a command to install the protected application 168. The command can include network addresses through which the management agent 165 can download the protected application 168.

Alternatively, the protected application 168 can be downloaded and installed from an application store or another third provider. The management agent 165 can determine that the protected application 168 has been installed on the client device 109. The management agent 165 can transmit an identifier of the protected application 168 to the management service 120, for example, along with a list of applications installed on the client device 109.

In step 409, the management agent 165 can receive, from the management service 120, a security label 172 and a list of permitted applications 173 for the protected application 168. The security label 172 can include a bit vector of a predetermined number of bits, such as a 32-bit vector. The security label 172 can be a value that is to be embedded within each file created, downloaded, received, or otherwise originated by a protected application 168. The security label 172 can be uniquely associated with a protected application 168 so that the protected application 168 can be identified using the security label 172.

In step 412, the management agent 165 can write a security label map 174 to the kernel layer 209. The management agent 165 can invoke a function provided by the user-space driver 218. The function can allow the management agent 165 to write a security label map 174 to the user-space driver 218, a memory address or location associated with the user-space driver 218, or otherwise in the kernel layer 209. The security label map 174 can include a list or set of application-specific security labels 172. The security label map 174 can include a list of the permitted applications 173 for each application-specific security label 172. The list of permitted applications 173 identities a set of applications that are permitted to access files that are embedded with the security label 172. The management agent 165 can generate the security label map 174 based on the security label 172 and the list of permitted applications 173 that are received from the management service 120. Alternatively, the management agent 165 can receive the security label 172 and the list of permitted applications 173 within from the management service 120 in the form of a security label map 174.

In step 415, the protected application 168 can originate a file on the client device 109. For example, the protected application 168 can receive a file electronically and write the file in a memory location, a container, or another location of the data store 163. The protected application 168 can also create a document or file in response to user input. The container application 166 and the management agent 165 can detect that the protected application 168 has written a file to the data store 163. In some cases, the container application 166 and the management agent 165 can monitor the protected application 168 or a particular set of memory locations for files originated by the protected application 168. The memory locations are associated with the protected application 168 or a container for the protected application 168.

In step 418, the secure file 223 can be generated. The protected application 168, the management agent 165, or the container application 166 can embed the security label 172 in a file to generate the secure file 223. The secure file 223 can be generated based on a file originated by the protected application 168. The security label 172 can be uniquely associated with the protected application 168 that originated the file.

The protected application 168 can generate the secure file 223. The management service 120 or an enterprise can develop the protected application 168 to secure enterprise activities. The protected application 168 can include a particular security label 172. The protected application 168 can create, download, or receive a file, and can generate the secure file 223 by embedding the security label 172 in that file. The management service 120 can maintain or store a security label map 174 or another data structure that records the association between the particular security label 172 and the protected application 168. In some cases, the management service 120 can provide the particular security label 172 to the protected application 168.

The container application 166 can generate the secure file 223 for the protected application 168. The container application 166 can monitor the protected application 168, or memory allocated to the protected application 168, for files that are downloaded, created, received, or otherwise originated. The container application 166 can protect the file by creating a secure file 223 that includes the security label 172 for the protected application 168. The container application 166 can reference a locally or remotely stored data structure that associates the particular security label 172 with the protected application 168. In some cases, the security label map 174 can provide this association. The container application 166 can periodically receive or retrieve this information from the management service 120. The management agent 165 can check in with the management service 120, retrieve an updated security label map 174, or another data structure that associates the particular security label 172 with the protected application 168. The management agent 165 can provide the container application 166 with access to the data structure that associates the particular security label 172 with the protected application 168.

In other examples, the management agent 165 can generate the secure file 223. The management agent 165 can monitor the protected application 168, or memory allocated to the protected application 168, for files that are downloaded, created, received, or otherwise originated. The management agent 165 can protect the file by creating a secure file 223 that includes the security label 172 for the protected application 168 that originated the file. The management agent 165 can reference a locally or remotely stored data structure that associates the particular security label 172 with the protected application 168. In some cases, the security label map 174 can provide this association. The management agent 165 can periodically receive or retrieve this information from the management service 120, for example, upon checking in with the management service 120.

Figure 5:
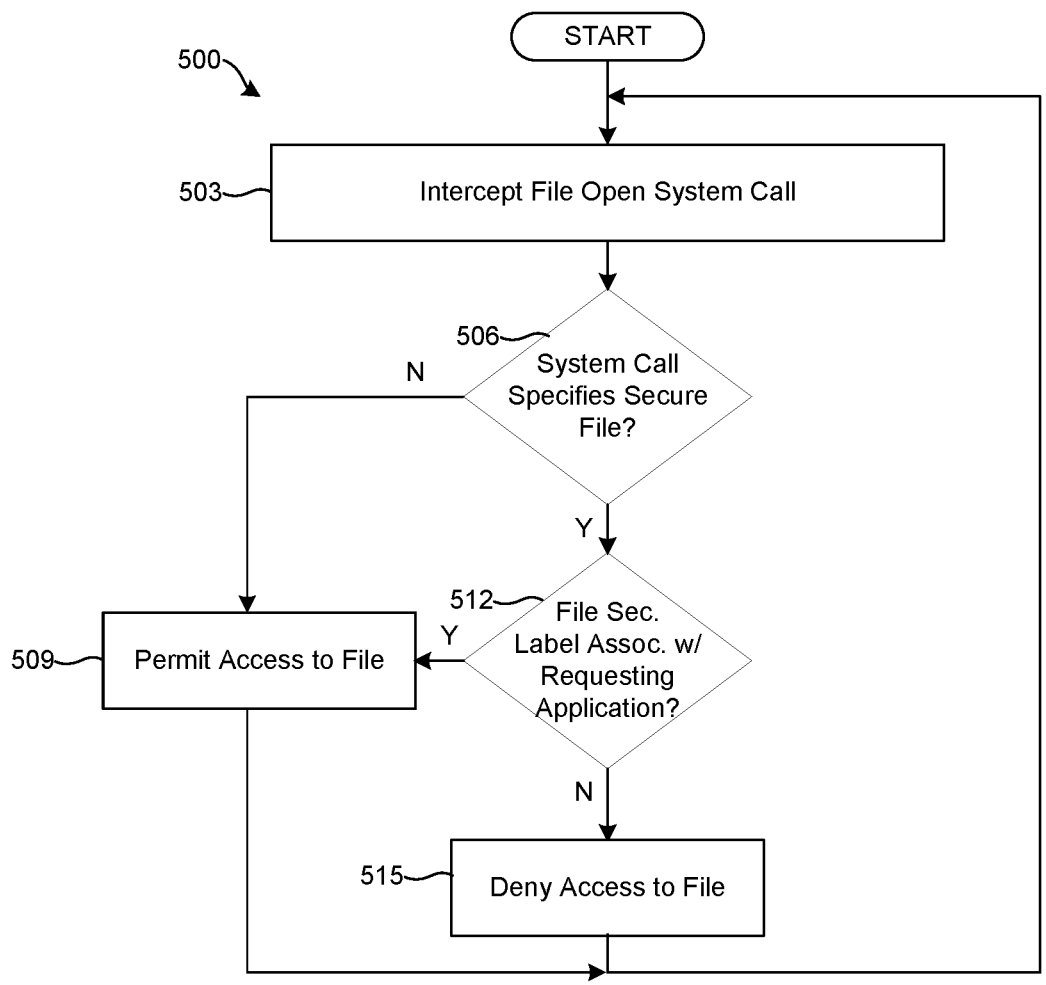
FIG. 5 is a flowchart that illustrates functionality implemented by components of the networked environment of FIG. 1.

FIG. 5 shows a flowchart 500 that illustrates functionality implemented by components of the networked environment 100. Specifically, the flowchart 500 illustrates how instructions in the kernel layer 209 of the client device 109 provide mechanisms to protect secure files 223 that are originated by protected applications 168.

In step 503, the kernel-layer management instructions 164 can intercept a file open system call. An application can request to access a file on the client device 109. The application can utilize a system call such as a file open system call in order to request access to the file. The kernel-layer management instructions 164 can identify an application identifier of the requesting application. The kernel-layer management instructions 164 can also identify the file that is specified in the system call.

In step 506, the kernel-layer management instructions 164 can determine whether the system call specifies a secure file 223. The kernel-layer management instructions 164 can determine that the system call specifies a secure file 223 by inspecting an inode table of the secure file and determining that a security label 172 is present. The kernel-layer management instructions 164 can determine that the system call does not specify a secure file 223 by inspecting an inode table of the secure file and determining that a security label 172 is absent.

If a security label 172 is present within the file, then the kernel-layer management instructions 164 can determine that the system call has specified a secure file 223, and can proceed to step 509. However, if no security label 172 is present the kernel-layer management instructions 164 can proceed to step 512 and permit access to the file, because the file is not a secure file 223 and did not originate from a protected application 168.

In step 509, the kernel-layer management instructions 164 can determine whether the security label 172 of the secure file 223 is associated with the requesting application. The kernel-layer management instructions 164 can access the security label map 174. Using the security label 172 as a key, the kernel-layer management instructions 164 can identify the list of permitted applications 173 for the security label 172. The kernel-layer management instructions 164 can compare the application identifier of the requesting application with the list of permitted applications 173. The list of permitted applications 173 can specify applications that are permitted to access files originated by the protected application 168. If the list of permitted applications 173 includes the application identifier of the requesting application, then the process can proceed to step 512. Otherwise, if the list of permitted applications 173 excludes the application identifier of the requesting application, then the process can proceed to step 515.

In step 512, the kernel-layer management instructions 164 can permit access to the file. The kernel-layer management instructions 164 can pass the file open system call to the appropriate operating system mechanism. In some cases, the kernel-layer management instructions 164 can permit access to the secure file 223 by passing the system call to the binder 309. The kernel-layer management instructions 164 can also contain instructions that provide access to the secure file 223.

In step 515, the kernel-layer management instructions 164 can deny access to the secure file 223. For example, the kernel-layer management instructions 164 can discard or terminate the file open system call that specifies the secure file 223. In this way, the kernel-layer management instructions 164 can prevent an untrusted application from accessing the secure file 223.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by a client application 167, protected application 168, container application 166, management agent 165, management service 120, or another application can be rendered. The user interface can be generated with user interface data provided by the management system 103. The client devices 109 can also include one or more input/output devices that can include, for example, a capacitive touchscreen or other type of touch input device, fingerprint reader, or keyboard.

Although the management service 120, management agent 165, client applications 167, container application 166, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system for web application security through containerization, the system comprising:
   a client device comprising at least one processor; and
   a data store comprising executable instructions, wherein the instructions, when executed by the at least one processor, cause the client device to at least:
   transmit, by a container application to a management service accessed over a network, an identifier of a protected application that is loaded in a container of the container application;
   receive, by the container application, in response to transmitting the identifier of the protected application to the management service, a security label for the protected application, and a list of permitted applications that are allowed to access files originated by the protected application, wherein the container application uses the security label to identify and protect the files originated by the protected application;
   write a security label map within a kernel layer of the client device, the security label map comprising: the security label, and the list of permitted applications;
   generate, by the container application, a secured file by embedding the security label within a file originated by the protected application;
   intercept, by kernel-level management instructions, a file access system call to access the secured file;
   determine, by the kernel-level management instructions, an application identity for an application that invokes the file access system call; and
   permit or deny, by the kernel-level management instructions, access to the secured file based on a comparison of the application identity with the list of permitted applications within the security label map.

2. The system of claim 1, wherein the container application calls a function that writes the security label map, wherein the function is exposed by a user driver within the kernel layer.

3. The system of claim 1, wherein the instructions, when executed by the at least one processor, cause the client device to at least:
   install the protected application on the client device, wherein the security label and the list of permitted applications are received based on the protected application being installed on the client device.

4. The system of claim 1, wherein the security label is uniquely associated with the protected application.

5. The system of claim 1, wherein the security label is embedded within an inode table.

6. The system of claim 1, wherein the kernel-level management instructions permit access to the secured file by passing the file access system call to an inter-process communication mechanism.

7. The system of claim 1, wherein the kernel-level management instructions deny access to the secured file by preventing the file access system call from being passed to an inter-process communication mechanism.

8. A method performed by instructions executed by a client device, the method comprising:
   transmitting, by a container application to a management service accessed over a network, an identifier of a protected application that is loaded in a container of the container application;
   receiving, by the container application, in response to transmitting the identifier of the protected application to the management service, a security label for the protected application, and a list of permitted applications that are allowed to access files originated by the protected application, wherein the container application uses the security label to identify and protect the files originated by the protected application;
   writing a security label map within a kernel layer of the client device, the security label map comprising: the security label, and the list of permitted applications;
   generating, by the container application, a secured file by embedding the security label within a file originated by the protected application;
   intercepting, by kernel-level management instructions, a file access system call to access the secured file;
   determining, by the kernel-level management instructions, an application identity for an application that invokes the file access system call; and
   permitting or denying, by the kernel-level management instructions, access to the secured file based on a comparison of the application identity with the list of permitted applications within the security label map.

9. The method of claim 8, wherein the container application calls a function that writes the security label map, wherein the function is exposed by a user driver within the kernel layer.

10. The method of claim 8, further comprising:
    installing the protected application on the client device, wherein the security label and the list of permitted applications are received based on the protected application being installed on the client device.

11. The method of claim 8, wherein the security label is uniquely associated with the protected application.

12. The method of claim 8, wherein the security label is embedded within an inode table.

13. The method of claim 8, wherein the kernel-level management instructions permit access to the secured file by passing the file access system call to an inter-process communication mechanism.

14. The method of claim 8, wherein the kernel-level management instructions deny access to the secured file by preventing the file access system call from being passed to an inter-process communication mechanism.

15. A non-transitory computer-readable medium comprising executable instructions, wherein the instructions, when executed by at least one processor, cause a client device to at least:
- transmit, by a container application to a management service accessed over a network, an identifier of a protected application that is loaded in a container of the container application;
- receive, by the container application, in response to transmitting the identifier of the protected application to the management service, a security label for the protected application, and a list of permitted applications that are allowed to access files originated by the protected application, wherein the container application uses the security label to identify and protect the files originated by the protected application;
- generate, by the container application, a secured file by embedding the security label within a file originated by the protected application;
- write a security label map within a kernel layer of the client device, the security label map comprising: the security label, and the list of permitted applications;
- intercept, by kernel-level management instructions, a file access system call to access the secured file;
- determine, by the kernel-level management instructions, an application identity for an application that invokes the file access system call; and
- permit or deny, by the kernel-level management instructions, access to the secured file based on a comparison of the application identity with the list of permitted applications within the security label map.

16. The non-transitory computer-readable medium of claim 15, wherein the container application calls a function that writes the security label map, wherein the function is exposed by a user driver within the kernel layer.

17. The non-transitory computer-readable medium of claim 15, wherein the instructions, when executed by the at least one processor, cause the client device to at least:
- install the protected application on the client device, wherein the security label and the list of permitted applications are received based on the protected application being installed on the client device.

18. The non-transitory computer-readable medium of claim 15, wherein the security label is uniquely associated with the protected application.

19. The non-transitory computer-readable medium of claim 15, wherein the security label is embedded within an inode table.

20. The non-transitory computer-readable medium of claim 15, wherein the kernel-level management instructions permit access to the secured file by passing the file access system call to an inter-process communication mechanism.

* * * * *